US006662183B2

(12) United States Patent
Beyer

(10) Patent No.: US 6,662,183 B2
(45) Date of Patent: Dec. 9, 2003

(54) VENDOR INDEPENDENT NETWORK CONFIGURATION TOOL METHOD, SYSTEM, AND PRODUCT

(75) Inventor: David Paul Beyer, Eden Prairie, MN (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 09/826,757

(22) Filed: Apr. 5, 2001

(65) Prior Publication Data

US 2002/0147715 A1 Oct. 10, 2002

(51) Int. Cl.[7] ............................................. G06F 17/30
(52) U.S. Cl. .................. 707/10; 707/103 R; 707/104.1; 705/26; 709/223
(58) Field of Search ............................. 707/3, 4, 5, 10, 707/102, 200, 100, 103 R, 104.1; 703/13; 705/10, 26, 27; 709/223; 710/36

(56) References Cited

U.S. PATENT DOCUMENTS

| | | | |
|---|---|---|---|
| 5,557,775 A | 9/1996 | Shedletsky | 395/500 |
| 5,784,539 A | 7/1998 | Lenz | 395/50 |
| 5,809,282 A | 9/1998 | Cooper et al. | 395/500 |
| 5,821,937 A | 10/1998 | Tonelli et al. | 345/356 |
| 5,831,610 A | 11/1998 | Tonelli et al. | 345/335 |
| 5,895,454 A * | 4/1999 | Harrington | 705/26 |
| 5,963,915 A * | 10/1999 | Kirsch | 705/26 |
| 6,058,262 A | 5/2000 | Kawas et al. | 395/500.34 |
| 6,151,643 A * | 11/2000 | Cheng et al. | 710/36 |
| 6,397,221 B1 * | 5/2002 | Greef et al. | 707/102 |
| 6,442,549 B1 * | 8/2002 | Schneider | 707/10 |

OTHER PUBLICATIONS http://www.makesys.com/products/index.html, *Netmaker MainStation Version 3*, Nov. 28, 2000, pp. 1–3.
http://www.ndacorp.com/Products.html, *Autonet Family Intro*, Nov. 28, 2000, pp. 1–3.
http://www.nacmind.com/, *Premier Network Design Software Tools and Competitive Databases*, Nov. 28, 2000, pp. 1–2.
http://www.nacmind.com/nac/prodinfo.htm, *Network Analysis Center Inc. Product Information*, Nov. 28, 2000, pp. 1–21.

* cited by examiner

*Primary Examiner*—Shahid Al Alam
(74) *Attorney, Agent, or Firm*—Duke W. Yee; David A. Mims, Jr.; Lisa L. B. Yociss

(57) ABSTRACT

A method, system, and product are described for configuring a computer network. A database is established which includes information about multiple network products. The network products are supplied by multiple different vendors. The computer network is then configured by selecting ones of the network products to implement the computer network. The computer network is thus configured utilizing products available from different vendors. Attributes are established which are used to evaluate network products. Each of the network products are assigned a weighted value for each of the attributes. A selection of network products is made utilizing the attributes and the weighted values assigned to the network products.

18 Claims, 5 Drawing Sheets

| ATTRIBUTES / USER TYPES | NETWORK-SYSTEM AVAILABILITY | PERFORMANCE/ CAPACITY RATING | LOCATION | COST RATING | APPLICATION |
|---|---|---|---|---|---|
| MOBILE WORKERS | 24x7 FROM ANY LOCATION | 4 | MOBILE | 5 | CRM, SCM, E-MAIL |
| ENGINEERS | 7-6 M-F | 5 | FIXED-HQ | 4 | CAD, ERP, E-MAIL |
| ADMINISTRATIVE/ CLERICAL | 7-6 M-F | 1 | FIXED-HQ | 2 | HR, E-MAIL |
| FACTORY/ WAREHOUSE | 24x7 BATCHED | 2 | FACTORY | 2 | TIME/LABOR, ERP |
| PROFESSIONAL/ KNOWLEDGE WORKERS | 7-6 M-F | 5 | FIXED-HQ | 3 | E-MAIL, BI |

*FIG. 6*

| ATTRIBUTES / MODEL | AVAILABILITY RATING | PERFORMANCE/ CAPACITY RATING | KEY FUNCTIONS | COST RATING | APPLICATION |
|---|---|---|---|---|---|
| 4400 | 3 | 1 | DESIGNED FOR SOHO, MINIMAL OPTIONS, LOW COST, ETHERENT AND TCP/IP ENVIRONMENTS SUPPORTED | 1 | LOW USAGE, SINGLE USER (UP TO 4), INTER/INTRANET USAGE, E-MAIL, SURFING |
| 5500 | 4 | 2 | DESIGNED FOR SMALL OFFICES, MINIMAL OPTIONS, SUPPORT UP TO 30 USERS, SOME NETWORK MANAGEMENT | 2 | SMALL SCALE ROUTER FOR E-MAIL, DOWNLOAD/ UPLOAD ACTIVITY, WEB HOSTING FOR SMALL/ HOME SITES |
| 6600 | 4 | 3 | MID-SIZED CLIENTS WITH 100-500 USERS NEEDING CONNECTION; INTEGRATED NETWORK MANAGEMENT WITH CiscoWorks | 4 | INTERMEDIATE SCALE ROUTER SUPPORTING ALL TRAFFIC TYPES; FAIR PERFORMANCE; MOST PROTOCOLS SUPPORTED |
| 7700 | 5 | 4 | LARGE CLIENT LOCATIONS, SUPPORTING MULTIPLE PROTOCOLS, DYNAMIC SWITCHING | 4 | DESIGNED FOR MID-LARGE CLASS USER POPULATION |
| 8800 | 5 | 5 | LARGEST ROUTER IN PRODUCT LINE, EXTENSIVE AVAILABILITY OPTIONS, HIGH PERFORMANCE | 5 | ANY INTENSIVE ENVIRONMENT (WEB SITE HOSTING); LARGE NUMBER OF USERS |

*FIG. 7*

VENDOR INDEPENDENT NETWORK CONFIGURATION TOOL METHOD, SYSTEM, AND PRODUCT

BACKGROUND OF THE INVENTION

1. Technical Field

The present invention relates generally to the field of computer systems and, more specifically to computer systems including a method, system, and product for configuring a computer network utilizing products supplied by different vendors.

2. Description of Related Art

In the networking services business, there are hundreds, if not thousands, of possibilities when designing computer networks. These options revolve around which vendor's networking hardware is used, which carriers/service providers are used for the transport layer, which standards/protocols are most appropriate, and which niche vendors provide specialized network equipment. A large part of configuring a network design is eliminating the large number of options and arriving at a few good options for the particular client situation. This process of eliminating options is highly time consuming and also highly dependent on the individual network designer who is responsible for choosing these options. The network designer may be familiar with and have experience with only a limited number of products. As a result, most network designs end up including products and services that the individual network designer knows and has worked with in the past. However, the network design selected by a particular individual may not be the best choice for a particular client.

Some network product vendors currently offer configuration tools accessible through the vendor's Internet site. A user may access a particular vendor's site, provide information about a network being designed, and receive information about all of that particular vendor's products which could be used to implement the network design. However, these vendors select only the vendor's products to include in the network design. None of the vendors select any competitor's products to include in the recommended network design. Further, the vendors will return information about all of its products which could be selected resulting in an overwhelming amount of data for the designer to consider.

Therefore, a need exists for a method, system, and product for configuring a computer network utilizing only the most appropriate products supplied by one or more different vendors.

SUMMARY OF THE INVENTION

A method, system, and product are described for configuring a computer network. A database is established which includes information about multiple network products. The network products are supplied by multiple different vendors. The computer network is then configured by selecting ones of the network products to use to implement the computer network. The computer network is thus configured utilizing products available from different vendors. Attributes are established which are used to evaluate network products. Each of the network products are assigned a weighted value for each of the attributes. A selection of network products is made utilizing the attributes and the weighted values assigned to the network products.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a block diagram of a user profile created utilizing a vendor independent database in accordance with the present invention; and FIG. 7 is a block diagram of a vendor profile created utilizing a vendor independent database in accordance with the present invention.

DETAILED DESCRIPTION OF THE PREFERRED EMBODIMENT

Figure 1:
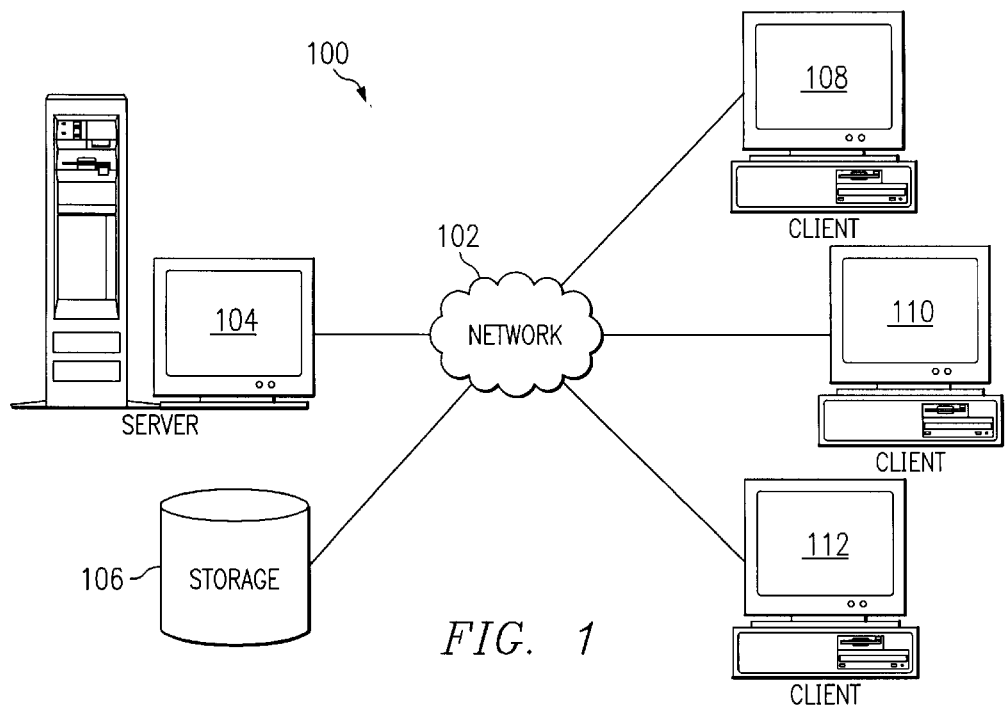
FIG. 1 depicts a block diagram of a data processing system in which the present invention may be implemented.

A preferred embodiment of the present invention and its advantages are better understood by referring to the figures, like numerals being used for like and corresponding parts of the accompanying figures.

The invention is preferably realized using a well-known computing platform, such as an IBM RS/6000 server running the IBM AIX operating system. However, it may be realized in other popular computer system platforms, such as an IBM personal computer running the Microsoft Windows operating system or a Sun Microsystems workstation running operating systems such as UNIX or LINUX, without departing from the spirit and scope of the invention.

The present invention is a vendor independent configuration method, system, and product. A database is created which includes information about different products available from different vendors. The vendors are typically competitors of each other.

The configuration tool may be utilized by a user to design a computer network. The user must enter information which is used to generate a generic network layout. The generic layout describes the types of necessary network products. The generic layout does not include any specification of particular vendors' products. Once the generic layout is completed, the database is searched to locate the products which could be utilized to implement each component of the network.

When the database is created, a weighting value is assigned to each product for each different attribute. The attributes are used to evaluate a computer network and to evaluate the different products. For the following attributes, a weighting value may be specified for each product:

Performance: speed through the system;

Scaleability: ability to add additional components to the system to increase its capabilities;

Availability: failure rates (MTBF—mean time between failures);

Capacity: maximum load handled by the system;

Recoverability/Fault Tolerance: features which may be included such as dual power supplies, alternate processors;

Manageability: tools or functions available to monitor or manage the system;

Maintainability: how easy it is to install and maintain the system;

Operability: how easy it is to operate or use;

Accessibility: when does the system need to be available;

Measurability: ability to provide statistics to measure throughput/traffic;

Capability/Functionality: the extra features or functions of this system which are not included in other systems; and Price.

The overall computer network to be designed is evaluated and a weighting value is assigned for some or all of these attributes. In addition, each product is evaluated and a weighting value is assigned for each of these attributes, for only some or these attributes, or for any other attribute which might be of interest when evaluating products to be included in a computer network.

The database may include information about each individual product available from a vendor, or it may include information about each product family available from the vendors. Often, each product which is part of a product family will be evaluated similarly with regard to the attributes. Including product families instead of individual products will reduce the size of the database and increase the speed of the configuration tool. Therefore, those skilled in the art will recognize that the present invention may be used with a database including either product families, products, or a combination of the two.

The database is searched to obtain information about the products which could be used to build the network. For each necessary network component, a calculation is performed to rate each product which might be used to implement that component. In this manner, the highest rated product, or a group of products which received high ratings, may be presented to the user to use to implement the network. The user may then select a product to use to implement each component.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
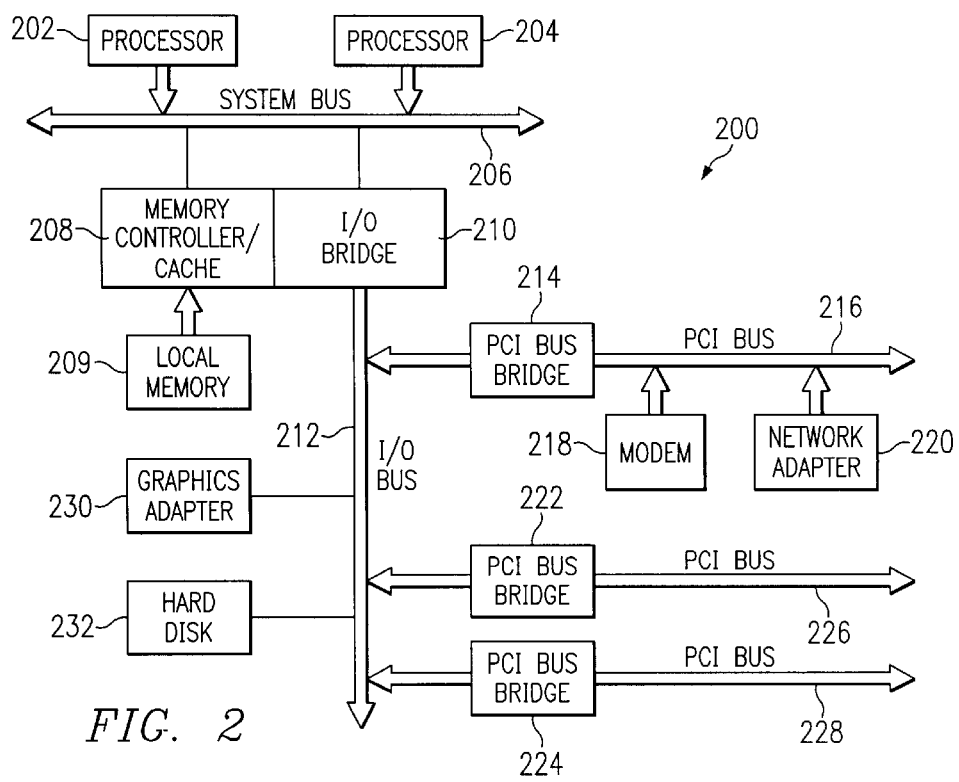
FIG. 2 illustrates a block diagram of a computer system which may be utilized as a server computer system in accordance with the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
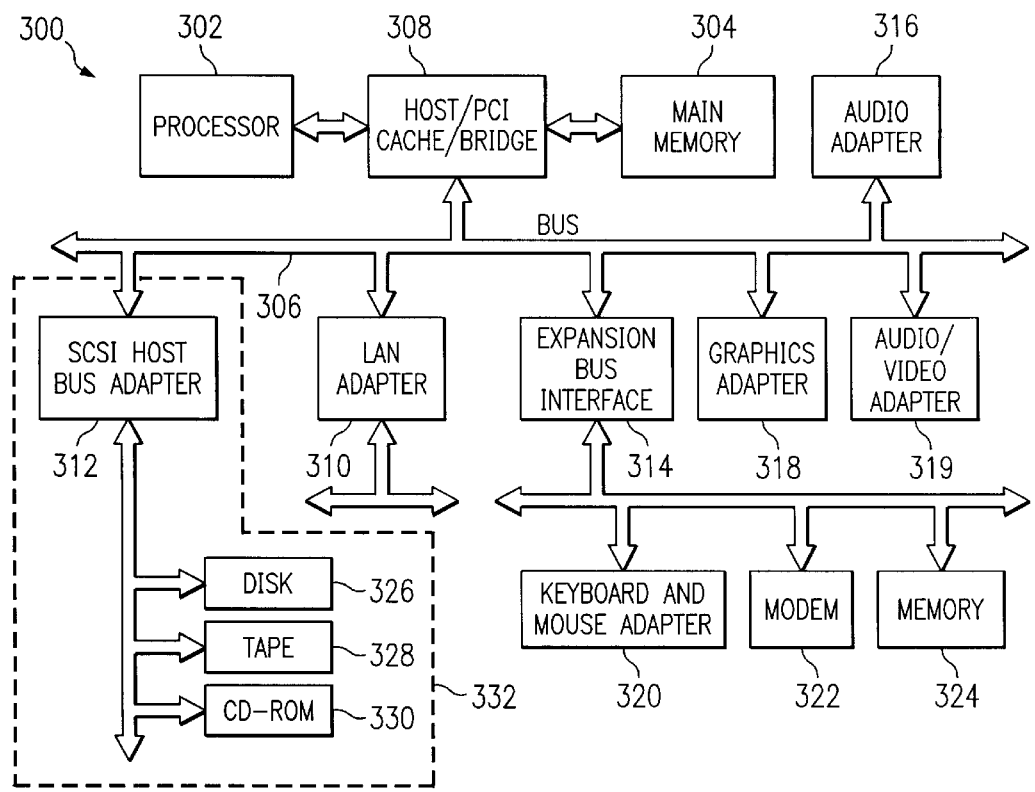
FIG. 3 depicts a block diagram of a computer system which may be utilized as a client computer system in accordance with the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
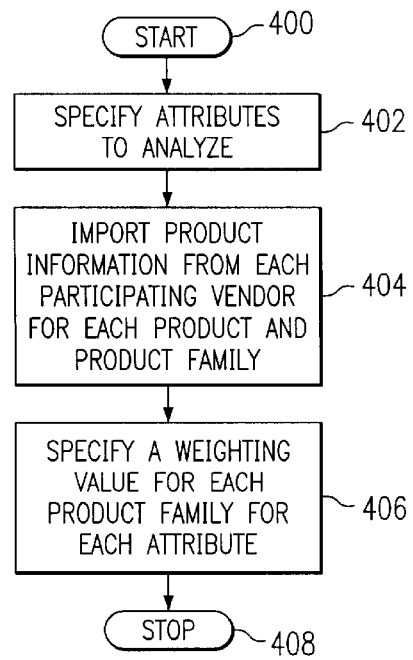
FIG. 4 is a high level flow chart which depicts the specification of attributes and a collection of product information for multiple, different, competing vendors in accordance with the present invention.

FIG. 4 is a high level flow chart which depicts a specification of attributes and a collection of product information for multiple, different, competing vendors in accordance with the present invention. The process starts as depicted by block 400 and thereafter passes to block 402 which illustrates a specification of attributes to use to analyze the products. Next, block 404 depicts importing product information from each participating vendor for each product, each product family, or both products and product families. Next, block 406 illustrates a specification of a weighting value for each product family, and/or each product, for each attribute. The process then terminates as depicted by block 408.

Figure 5:
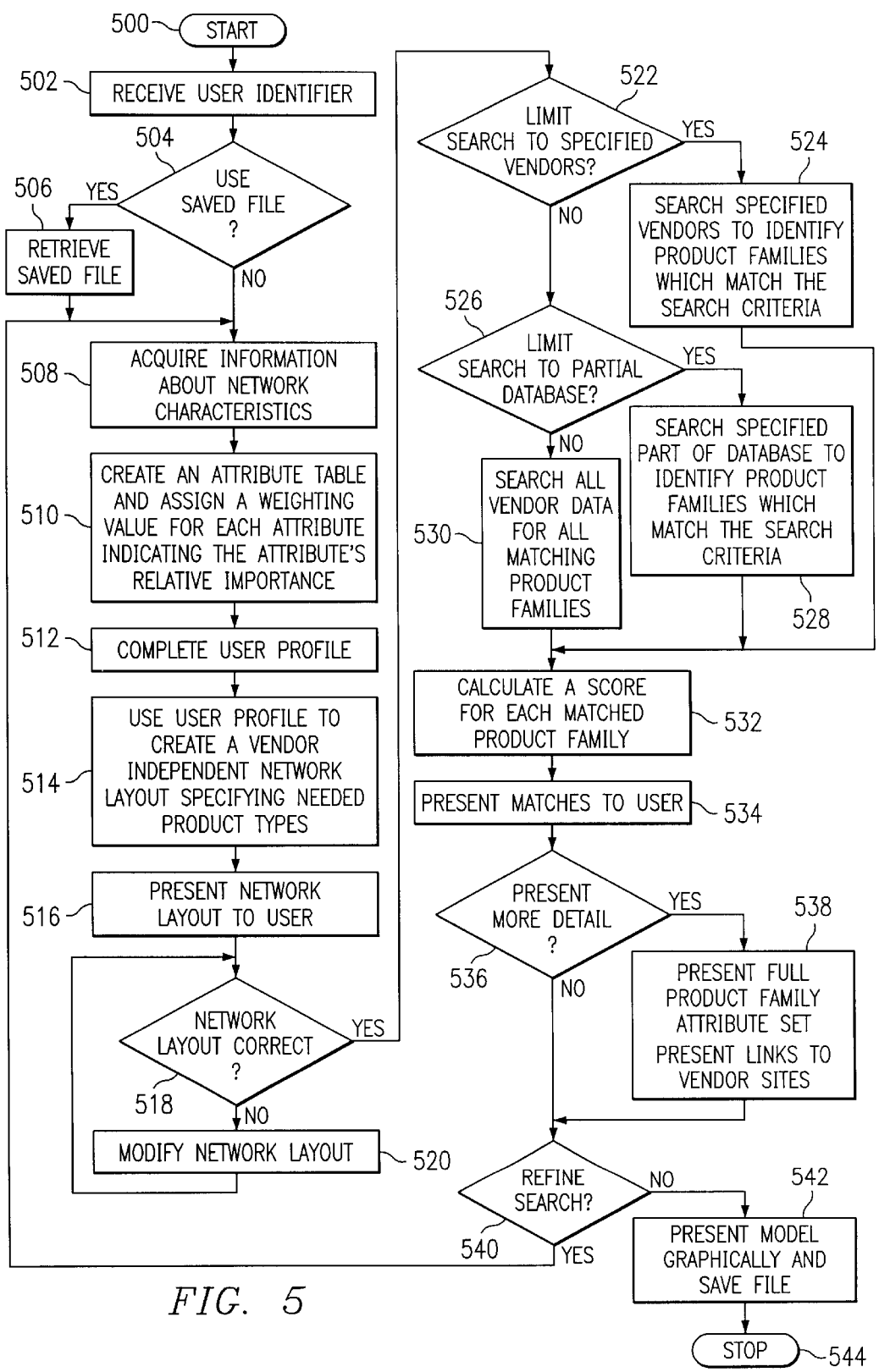
FIG. 5 is a high level flow chart which illustrates a vendor independent network configuration tool in accordance with the present invention.

FIG. 5 is a high level flow chart which illustrates a vendor independent network configuration tool in accordance with the present invention. The process starts as depicted by block 500 and thereafter passes to block 502 which illustrates a receipt of a user identifier. Next, block 504 depicts a determination of whether or not a saved file is to be used. If a determination is made that a saved file is to be used, the process passes to block 506 which illustrates retrieving a saved file which was saved for this particular user. The process then passes to block 508. Referring again to block 504, if a determination is made that a saved file is not to be used, the process passes to block 508.

Block 508, depicts acquiring information about the network characteristics of the network the user wishes to design. The network characteristics may describe the network as being a local area network, a wide area network, a voice, data, video, or a combined network. Information about the intended users of the network is also obtained. Information about the total number of users, user locations, type of users, and their requirements is collected. The process then passes to block 510 which illustrates creating an attribute table and assigning a weighting value for each attribute which indicates that attribute's relative importance. The user ranks each attribute according to its relative importance. Thereafter, block 512 depicts completing a user profile which includes the network information and attribute table, such as depicted by FIG. 6. Next, block 514 illustrates using the user profile to create a vendor independent network layout which specifies all network components necessary to complete the network layout. Block 516, then, depicts presenting the layout to the user. At this stage in the process, a black box implementation is created and displayed to the user using only generic names for the different network components. No vendor information is presented. This black box implementation indicates basic connectivity and network functionality.

The process then passes to block 518 which illustrates a determination of whether or not the network layout is correct. If a determination is made that the network layout is not correct, the process passes to block 520 which depicts a modification of the network layout. The process then passes back to block 518.

Referring again to block 518, if a determination is made that the network layout is correct, the process passes to block 522 which illustrates a determination of whether or not the search is to be limited to specified vendors. A user may have a preference for only a particular subset of all vendors. If a determination is made that the search is to be limited to specified vendors, the process passes to block 524 which depicts searching product information for only those specified vendors' product families which match the search criteria. The process then passes to block 532.

Referring again to block 522, if a determination is made that the search should not be limited to specified vendors, the process passes to block 524 which illustrates a determination of whether or not the search should be limited to only part of the full database of vendor product information. If a determination is made that the search should be limited, the process passes to block 526 which depicts searching only part of the full database of vendor product information which match the search criteria. The process then passes to block 532.

Referring again to block 526, if a determination is made that the search should not be limited to only part of the database, the process passes to block 530 which illustrates searching the full vendor product database for all matching product families for each component of the network. At this point, for each necessary network component, all product families, or products, which could be used to implement that component are retrieved.

Block 532 depicts calculating a score for each product family or product which matched the search criteria for each component of the network. A score is first calculated for each attribute for a product family. The attribute score is calculated by multiplying the weighting value assigned to a particular attribute by the weighting value given to this product family for this particular attribute. A total score for the product family is calculated by adding the individual attribute scores calculated for this product family together.

Thereafter, block 534 illustrates presenting the product families having the highest total scores and which matched the search criteria. The highest scoring product family may be presented. In this manner, only one result is returned for each component of the network. Alternatively, a particular number of product families may be presented. For example, the product families which received the highest three scores may be presented.

As an example, suppose a user ranked eleven attributes in descending order of importance as follows: operability, scaleability, manageability, performance, and so on with the most important attribute receiving the highest weighting value. The highest attribute, operability, is then assigned a weighting value of "11". The other attributes are assigned weighting values as follows: scaleability assigned a "10", manageability assigned a "9", performance assigned an "8", and so on down to a "1". Further suppose a particular vendor family has been assigned a weighting value for the following features: operability—7; scaleability—8; manageability—6; performance—4; availability—8; recoverability—9; and maintainability—6. Therefore, for this vendor family, a score for operability is calculated by multiplying 11 by 7. A score for scaleability is calculated by multiplying 10 by 8. A score for manageability is calculated by multiplying 9 by 6. A score for performance is calculated by multiplying 8 by 4. Scores are calculated for this product family for all of the remaining attributes in a similar manner. A total score is then obtained by adding the scores for this product family for each attribute. Thus, the total score for this product family is obtained by adding together 77, 80, 54, 32, and the remaining attribute scores.

The process then passes to block 536 which depicts a determination of whether or not more detail is to be presented to the user. If a determination is made that more detail is to be presented, the process passes to block 538 which illustrates presenting the full results showing all attribute information for all product families which matched the search criteria. Next, block 540 depicts a determination of whether or not the search is to be refined. If a determination is made that the search is to be refined, the process passes back to block 508. Referring again to block 540, if a determination is made that the search is not to be refined, the process passes to block 542 depicts presenting the model graphically and saving the file associating it with this user identifier. The process then terminates as illustrated by block 544.

FIG. 6 is a block diagram of a user profile created utilizing a vendor independent database in accordance with the present invention. A plurality of user types which may use the network being configured are listed. For each user type, a weighting value is specified for each attribute. For example, mobile workers require a higher performance than clerical workers. Therefore, the performance attribute is weighted as a "4" for mobile workers, while performance is weighted as a "1" for clerical workers.

FIG. 7 is a block diagram of a vendor-specific product profile in accordance with the present invention. The profile includes a plurality of products, or product families, which have been evaluated with respect to some of the attributes. A vendor profile is created for each vendor participating in the present invention, and the results are stored in the database.

For example, as illustrated by FIG. 7, a particular model 4400 has a weighting value of "3" for the availability attribute, a weighting value of "1" for a performance capacity attribute, and a weighting value of "1" for a cost or price attribute. The numerical weighting values are used as described above in order to calculate an overall score for each product, or product family for each required component of the network. Textual information is also stored for this product family. The textual information may be displayed to a user to aid in a decision. The textual information may be displayed for all products which were selected during a search of the database.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a computer system for configuring a computer network, said method comprising the steps of:

establishing a database including information about a plurality of network products, said plurality of network products being supplied by a plurality of different vendors;

selecting ones of said plurality of network products to use to configure said computer network, said computer network being configured utilizing products available from a plurality of different vendors;

establishing a plurality of different network attributes, said plurality of network attributes being able to evaluative computer networks;

assigning a weighting value for each of said plurality of network attributes, said weighting value indicating a relative importance of each of said plurality of network attributes;

evaluating each of said plurality of network products with regard to each of said plurality of network attributes;

assigning a weighting value for each of said plurality of network products for each of said plurality of network attributes; and for each of said plurality of network attributes for each of said plurality of network products, determining an attribute score utilizing said weighting value assigned to each of said plurality of network products for each of said plurality of network attributes and utilizing said weighting value for each of said plurality of network attributes.

2. The method according to claim 1, further comprising the step of establishing said database including information about a plurality of network products, said plurality of network products being supplied by a plurality of competing vendors.

3. The method according to claim 1, further comprising the step of determining an overall score for each of said plurality of network products by adding together all attribute scores determined for said each of said plurality of network products.

4. The method according to claim 3, further comprising the step of generating an attribute table which includes a weighting value for each of a plurality of network attributes, said weighting value indicating a relative importance of each of said plurality of network attributes.

5. The method according to claim 4, further comprising the steps of:
generating a generic network layout for said computer network, said generic network layout including a plurality of network components, said plurality of network components being generic, vendor independent components; and
selecting ones of said plurality of network products to use for each of said plurality of network components.

6. The method according to claim 5, further comprising the step of utilizing said overall score to select one of said plurality of network products.

7. A computer program product in a computer system for configuring a computer network, comprising:
instruction means for establishing a database including information about a plurality of network products, said plurality of network products being supplied by a plurality of different vendors;
instruction means for selecting ones of said plurality of network products to use to configure said computer network, said computer network being configured utilizing products available from a plurality of different vendors;
instruction means for establishing a plurality of different network attributes, said plurality of network attributes being utilized evaluate computer networks;
instruction means for assigning a weighting value for each of said plurality of network attributes, said weighting value indicating a relative importance of each of said plurality of network attributes;
instruction means for evaluating each of said plurality of network products with regard to each of said plurality of network attributes;
instruction means for assigning a weighting value for each of said plurality of network products for each of said plurality of network attributes; and
for each of said plurality of network attributes for each of said plurality of network products, instruction means for determining an attribute score utilizing said weighting value assigned to each of said plurality of network products for each of said plurality of network attributes and utilizing said weighting value for each of said plurality of network attributes.

8. The product according to claim 7, further comprising instruction means for establishing said database including information about a plurality of network products, said plurality of network products being supplied by a plurality of competing vendors.

9. The product according to claim 7, further comprising instruction means for determining an overall score for each of said plurality of network products by adding together all attribute scores determined for said each of said plurality of network products.

10. The product according to claim 9, further comprising instruction means for generating an attribute table which includes a weighting value for each of a plurality of network attributes, said weighting value indicating a relative importance of each of said plurality of network attributes.

11. The product according to claim 10, further comprising:
instruction means for generating a generic network layout for said computer network, said generic network layout including a plurality of network components, said plurality of network components being generic, vendor independent components; and
instruction means for selecting ones of said plurality of network products to use for each of said plurality of network components.

12. The product according to claim 11, further comprising instruction means for utilizing said overall score to select one of said plurality of network products.

13. A computer system for configuring a computer network, comprising:
a database within said computer system including information about a plurality of network products, said plurality of network products being supplied by a plurality of different vendors;
ones of said plurality of network products being selected to use to configure said computer network, said computer network being configured utilizing products available from a plurality of different vendors;
a plurality of different network attributes, said plurality of network attributes being utilized to evaluate computer networks;
a weighting value being assigned for each of said plurality of network attributes, said weighting value indicating a relative importance of each of said plurality of network attributes;
each of said plurality of network products being evaluated with regard to each of said plurality of network attributes;
a weighting value being assigned for each of said plurality of network products for each of said plurality of network attributes; and
for each of said plurality network attributes for each of said plurality of network products, an attribute store being determined utilizing said weighting value assigned to each of said plurality of network products for each of said plurality of network attributes and utilizing said weighting value for each of said plurality of network attributes.

14. The system according to claim 13, further comprising said database including information about a plurality of network products, said plurality of network products being supplied by a plurality of competing vendors.

15. The system according to claim 13, further comprising an overall score being determined for each of said plurality of network products by adding together all attribute scores determined for said each of said plurality of network products.

16. The system according to claim 15, further comprising an attribute table being generated which includes a weighting value for each of a plurality of network attributes, said weighting value indicating a relative importance of each of said plurality of network attributes.

17. The system according to claim 16, further comprising:
a generic network layout being generated for said computer network, said generic network layout including a plurality of network components, said plurality of network components being generic, vendor independent components; and
ones of said plurality of network products being selected to use for each of said plurality of network components.

18. The system according to claim 17, further comprising said overall score being utilized to select one of said plurality of network products.

* * * * *

UNITED STATES PATENT AND TRADEMARK OFFICE
CERTIFICATE OF CORRECTION

PATENT NO. : 6,662,183 B2
DATED : December 9, 2003
INVENTOR(S) : Beyer

It is certified that error appears in the above-identified patent and that said Letters Patent is hereby corrected as shown below:

Column 8,
Lines 52-53, after "being", delete "able to evaluative" and insert -- utilized to evaluate --.

Column 9,
Line 39, after "utilized" insert -- to --.

Column 10,
Line 37, after "plurality" insert -- of --.
Line 38, after "attribute" delete "store" and insert -- score --.

Signed and Sealed this

Tenth Day of August, 2004

JON W. DUDAS
*Acting Director of the United States Patent and Trademark Office*